United States Patent [19]

Leyarovski et al.

[11] 3,854,914
[45] Dec. 17, 1974

[54] RECOVERY OF NEON AND HELIUM FROM AIR BY ADSORPTION AND CLOSED CYCLE NEON REFRIGERATION

[75] Inventors: Evgueni Iliev Leyarovski; Borislav Vassilev Nicolov; Yordan Krestev Gueorguiev, all of Sofia, Bulgaria

[73] Assignee: Physicheski Institute s Aneb pri Ban, Sofia, Bulgaria

[22] Filed: Jan. 27, 1972

[21] Appl. No.: 221,260

[30] Foreign Application Priority Data
Feb. 25, 1971  Bulgaria .......................... 16000

[52] U.S. Cl. .......................... 62/12, 62/18, 62/40
[51] Int. Cl. .......................... F25j 5/00
[58] Field of Search ......... 62/9, 11, 12, 13, 18, 22, 62/23, 40; 55/66

[56] References Cited
UNITED STATES PATENTS

| | | |
|---|---|---|
| 2,458,894 | 1/1949 | Collins .......................... 62/40 |
| 3,057,167 | 10/1962 | Yendall .......................... 62/22 |
| 3,407,614 | 10/1968 | Poska .......................... 62/18 |
| 3,415,069 | 12/1968 | Hauser .......................... 62/40 |
| 3,473,342 | 10/1969 | Leyarovski .......................... 62/22 |
| 3,517,521 | 6/1970 | Emerson .......................... 62/12 |
| 3,616,602 | 11/1971 | Hays .......................... 62/18 |

OTHER PUBLICATIONS

Leyarovski, Method for Obtaining Ne and He Cryogenics, Feb. 1970.

*Primary Examiner*—Norman Yudkoff
*Assistant Examiner*—Frank Sever
*Attorney, Agent, or Firm*—Karl F. Ross; Herbert Dubno

[57] ABSTRACT

A method of and an apparatus for the recovery simultaneously of substantial pure neon and helium from air wherein a neon cycle provides the cooling for condensation of the components to be removed. Condensation of neon is followed by an absorption step for recovery of residual neon.

2 Claims, 1 Drawing Figure

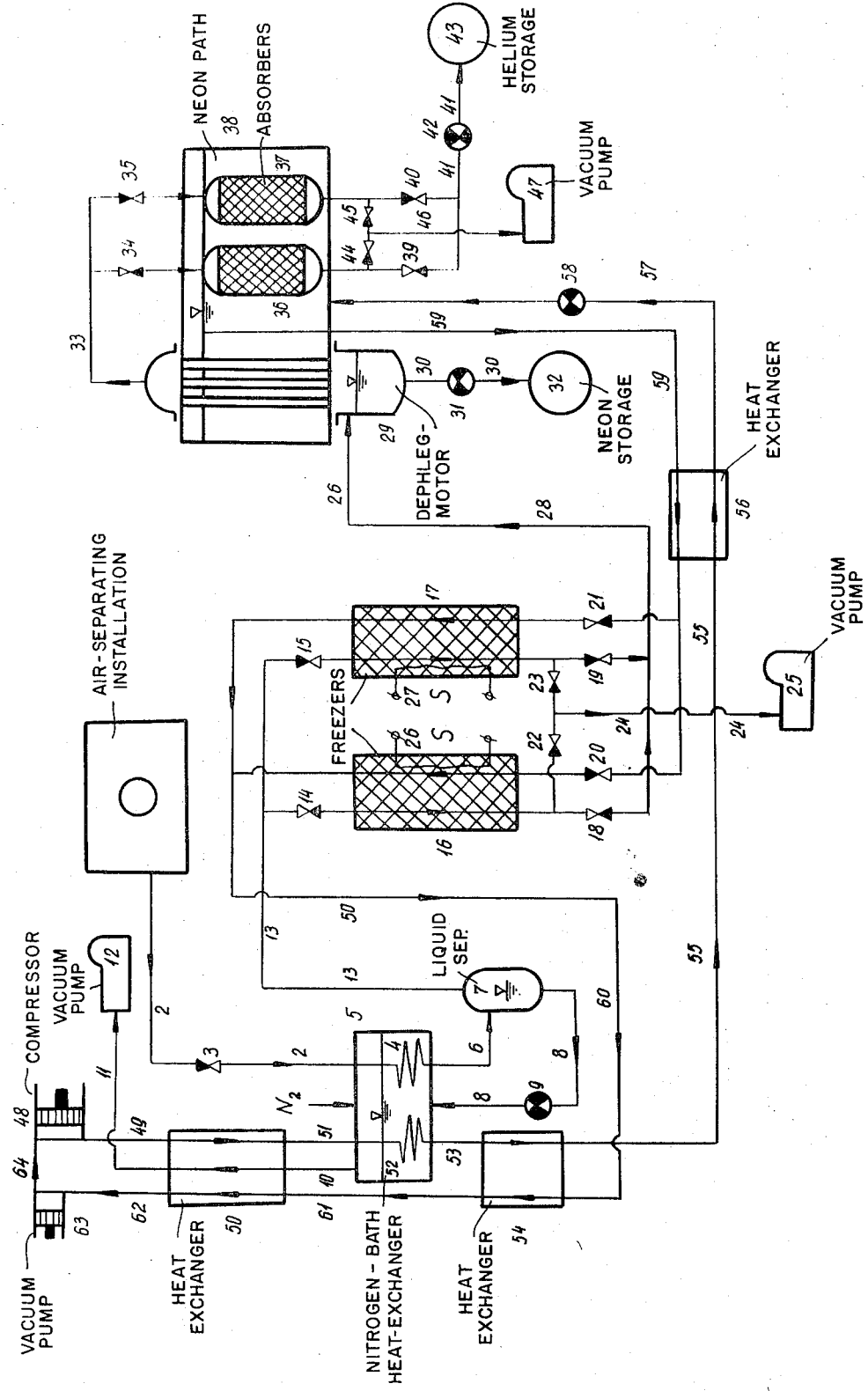

RECOVERY OF NEON AND HELIUM FROM AIR BY ADSORPTION AND CLOSED CYCLE NEON REFRIGERATION

FIELD OF THE INVENTION

The present invention relates to a method of and an apparatus for simultaneously obtaining pure neon and helium from waste gases of an air-separating installation through the successive processes of condensation and adsorption of the neon at temperatures below its normal boiling point, which are maintained by a neon refrigerating cycle, and desorption of the neon.

BACKGROUND OF THE INVENTION

From the air-separating condensors of an air-separation installation, an unliquefied gas-mixture, rich in neon and helium accumulates and is periodicaly discharged into the atmosphere. For the present this is the only source of neon and is already considered as a possible source of helium as well, because of exhaustion of helium gas resources and the rapid development of the oxygen and nitrogen industry.

The two main principles which have provided the bases for separating neon from the helium use:

The adsorption selectivity of the two gases.

The considerable difference in their boiling temperatures: the helium remains a gas in its supercritical state at temperatures at which the neon maintains above its crystals a vapor pressure of the order of microns Hg.

Both principles are employed in various methods for separating the neon-helium mixture from its components. Condensation methods are more perfect from a thermodynamic point of view, they are of higher efficiency, and the equipment is more compact and easy to operate. The two condensation methods developed so far, have considerable disadvantages: in the methods employed in the USSR and in the United States neon is solidified by heat exchange with solid hydrogen. The limit of purification of the helium is determined by the limiting temperature which can be obtained by evacuation of solid hydrogen with acceptable heattransfer ($14°$ K) and corresponds to about 98 percent pure helium. A method has also been employed in which the neon from the neon-helium mixture is liquefied under an elevated pressure up to 25 atm using an auxiliary refrigerating cycle with liquid neon. The helium thus obtained contains 10–12 percent neon and is obviously good for nothing.

The disadvantages of the two methods include:

Working with liquid and solid hydrogen is far from safe: to evacuate the vapor above solid hydrogen requires an expensive and complicated vacuum-pumping assembly. The heat transfer between the hydrogen crystals and the walls (for instance the tubes of the freezer) is poor, and the vapor pressure of the hydrogen at $12°$ K is about 10 mm Hg. All this makes a complicated heat-transfer surface extremely necessary.

The neon is incompletely extracted upon condensation; the compression of the neon- helium mixture brings about not merely technical dificulties (low yield) but also causes the dissolution of helium in the liquid neon under elevated pressure and contamination of the neon; if the first portions after the throttling are discarded, the losses of neon are increased.

With neither of the two methods is it possible to obtain sufficiently pure helium, and its contamination with neon makes it unsuitable for its primary use now-a-days, i.e. liquefaction.

OBJECT OF THE INVENTION

The object of the present invention is to obtain pure neon and helium simultaneously, in a safe and noninterrupted industrial process and with a high coefficient of extraction.

SUMMARY OF THE INVENTION

The method of the invention comprises successive condensation and adsorption of neon, at temperatures below $27°$ K as maintained by a neon refrigerating cycle, and desorption of the neon, working with neon is safe as compared to the work with hydrogen.

The maintenance in the neon bath of temperatures close to the triple point of the neon, by evacuation, makes it unnecessary to compress the starting mixture and enables the process to be carried out under low pressure (between 1 atm. and the pressure under which the mixture emerge from the air-separating installation, i.e. about 5 atm.).

The disadvantages of the German method are obviated in that for the absolute losses of neon, the partial pressure of the neon in the mixture is of great importance and is determined by the temperature and not by the general pressure:

the dissolution of helium in the liquid neon takes place in proportion to its partial pressure in the mixture; the discard of great portions of neon together with the helium dissolved at the throttling step is the chief source of losses in the German method whereas at the pressure of 4 atm. (the pressure of the mixture usually coming from the air-separating installation) the concentration of helium in the liquid meets the requirements for industrial purity of the neon, so that from the condenser of the equipment neon with standard purity is directly obtained.

The adsorber connected immediately after the condenser and into the same neon bath operates at a temperature close to the triple point of the neon, making it possible to directly obtain helium of high purity by fine purification from the neon, in a concentration of about 7–10 percent, corresponding to the equilibrium in the condenser. When using a molecular sieve instead of an ordinary adsorber, the adsorption of the helium to the neon is very small and the extract coefficient of the helium is above 95 percent.

Under the absorption conditions already mentioned, all the hydrogen in the mixture, wich is practically unsoluble in the liquid neon under the low pressures used in the method, is adsorbed together with neon-contaminated helium. Thus the present method solves the so called hydrogen problem in the separation of the neon-helium mixture.

The desorption of the neon by pumping (evacuation) out of the adsorber without increasing the temperature, bars from the refrigerating cycle also excludes the latent heat of adsorption and the sensible heat of the adsorber and the adsorbent at their periodical cooling down to operating temperature; at such desorption cooling the adsorbent functions continuously under isothermic conditions, and because it is able to be regenerated under vacuum conditions in a couple of minutes only, it is no longer necessary to provide a long period of time for to protect the adsorbent. This, together with the high degree of neon adsorption at extremely low temperature (far into the realm of capillary condensation) makes it possible for the adsorber to be constructed as a compact, simple, easily cooled apparatus, whose temperature is lowered only once, when activating the whole installation.

DESCRIPTION OF THE DRAWING

An embodiment of the installation according to the invention is shown in the drawing, the sole FIGURE of which is a flow diagram.

SPECIFIC DESCRIPTION AND EXAMPLE

The installation is constructed as follows: the air-separating installation is connected with the heat exchanger 4 by the pipe 2 and the valve 3; the heat exchanger 4 is connected with the liquid separator 7 through the pipe 6. The pipe 8 and the valve 9 connect the liquid separator 7 with the nitrogen bath 5, and the pipe 13 and the valves 14 and 15 connect the liquid separator 7 with the double freezer 16 and 17. The latter are in connection with the dephlegmator 29 through the valves 18 and 19 and the pipe 28. The connection between the doubled adsorbers 36 and 37 and the dephlegmator 29 is provided by the pipe 33 and the valves 34 and 35. The dephlegmator 29 is also connected with the gas holder 32 through the pipe 30 and the throttle valve 31. The connection between the adsorber 33 and 35 and the gas holder 43 is provided by the valves 39 and 40, the pipe 41 and the throttle valve 42. The evacuation of the freezers 16 and 17 is performed by the vacuum pump 25 through the valves 22 and 23 and the pipe 24, and the pumping-out of the adsorbers 36 and 37 through the valves 44 and 45, the pipe 46 and the vacuum pump 47.

The connections in the auxiliary refrigerating cycle are as follows: compressor 48, pipe 49, heat exchanger 50, pipe 51, heat exchanger 52, pipe 53, heat exchanger 54, pipe 55, heat exchanger 56, pipe 57, throttle valve 58, pipe 57, neon bath 38; vapor space of the neon bath 38, pipe 59, heat exchanger 56, double valves 20 and 21, double freezers 16 and 17, pipe 60, heat exchanger 54, pipe 61, heat exchanger 50, pipe 62, vacuum pump 63, pipe 64, compressor 48; nitrogen bath 4, pipe 10, heat exchanger 50, pipe 11, vacuum pump 12.

The equipment operates as follows: the neon-helium mixture containing 90-95 percent nitrogen under pressure of about 5 atm. enters from the air-separating installation 1 through the valve 3 into the nitrogen heat exchanger 4. In the latter the mixture is cooled by nitrogen, boiling under vacuum wheron most of the nitrogen in the mixture liquefies and collects in the liquid separator 7. The liquid nitrogen from the liquid separator 7 enters the nitrogen bath 5 after having been throttled by throttle valve 9. Its temperature and pressure diminish. The content of the nitrogen bath is pumped-out with vacuum pump 12.

After separating (removal of) the liquified nitrogen the neon-helium mixture is purified from the nitrogen left upon freezing the latter in the heat exchangers 16 and 17. The cooling of the mixture in them is carried out by the neon in the auxiliary cooling cycle. The switching of the heat exchangers when one is blocked with frozen nitrogen is performed by the double valves 14 and 15, 18 and 19, 20 and 21. The frozen nitrogen is removed from the respective heat exchanger by means of the heaters 26 and 27 and the vacuum pump 25 which is switched via the valves 22 and 23. After completion of the process of purifying the mixture from nitrogen in the heat exchangers 16 and 17, the mixture enters the dephlegmator 29. Here, on account of the evaporation of the liquid neon boiling under vacuum from the auxiliary cooling cycle, nearly all the neon in the mixture is liquefied (about 98 percent). The liquid neon falls to the bottom of the dephlegmator 29. From there, after throttling in the throttle valve 31 to atmospheric pressure, it enters the Dewar flasks for liquid neon, or, after evaporation into the gas holder 32 for neon 32. The quantity of helium dissolved in the liquid is extremely small and can be diminished further if the vapor formed at the throttling, is removed.

On leaving the dephlegmator the gas mixture contains besides helium, some quantities of neon and hydrogen as well. The latter are removed in the switching adsorbers 34 and 35.

As an adsorber a molecular sieve for the helium is used. As a result of the adsorption pure helium is obtained which enters into the helium gas holder through the valves 39 and 40. The adsorbers are switched by means of the valves 34 and 35, 39 and 40. The regeneration of the adsorbent is performed under vacuum conditions, provided by the vacuum pump 47 through the valves 44 and 45. As a result of the desorption, the temperature of the adsorbent is diminished considerably. Also the desorption is one of the two main sources of cold, the other source being the auxiliary neon-circulating cooling cycle which can be either a simple, throttle cycle with high pressure, or with an expander and intermediate or high pressure, The embodiment shown in the drawing has a simple throttle cycle with high pressure of about 200 atm.

The neon is compressed in the compressor 48 to about 200 atm., whereafter it enters the main heat-exchanger 50, where the temperature diminishes considerably. Then it undergoes additional cooling in the nitrogen heat-exchanger 52 and the heat exchangers 54 and 56. Then the compressed neon, cooled to the required degree, is throttled in the throttle valve 58 to the pressure that corresponds to the triple point of the neon, wherein part of it is liquefied and enters the neon bath 38. From there the neon vapor passes successively through the heat exchangers 56, 54 and 50, are heated to indoor temperature and after being compressed in vacuum pump 63 to the pressure of the gas holder, re-enter the compressor 48.

What we claim is:

1. A method of obtaining neon and helium from the air, comprising the steps of:
   a. separating nitrogen and oxygen from the air and producing a neon and helium gas mixture;
   b. cooling said neon and helium gas mixture by heat exchange with a circulating neon coolant in a closed auxiliary cooling cycle, thereby condensing neon with absorbed hydrogen from said mixture while producing a helium-rich gas containing neon and hydrogen;
   c. passing said helium-rich gas through an adsorbent retaining neon and hydrogen and recovering substantially pure helium continuously therefrom;
   d. desorbing neon and hydrogen from said adsorbent while using the latent heat of desorption to partly cool said gas mixture;

e. throttling the condensed neon with absorbed hydrogen to atmospheric pressure thereby forming hydrogen vapor and discharging the same; and f. removing hydrogen from the neon and helium subsequent to step (a) but prior to the recovery of pure helium in step (c).

2. The method defined in claim 1 wherein neon is desorbed from said adsorbent by subjecting the adsorbent to evacuation at a temperature lower than the normal boiling point of neon thereby recovering the cooling capacity of the latent heat of desorption.

* * * * *